United States Patent
Ramalingam et al.

(10) Patent No.: US 10,116,577 B2
(45) Date of Patent: Oct. 30, 2018

(54) DETECTING PATH MTU MISMATCH AT FIRST-HOP ROUTER

(71) Applicant: DELL PRODUCTS L.P., Round Rock, TX (US)

(72) Inventors: Purushothaman Ramalingam, Chennai (IN); Premnath Sundarababu, Chennai (IN); Mahesh Manivasagam, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 180 days.

(21) Appl. No.: 14/561,038

(22) Filed: Dec. 4, 2014

(65) Prior Publication Data
US 2016/0164794 A1    Jun. 9, 2016

(51) Int. Cl.
*H04L 12/805* (2013.01)
*H04L 12/729* (2013.01)
*H04L 12/825* (2013.01)

(52) U.S. Cl.
CPC .......... *H04L 47/365* (2013.01); *H04L 45/125* (2013.01); *H04L 47/26* (2013.01)

(58) Field of Classification Search
CPC .................................................... H04L 47/365
See application file for complete search history.

(56) References Cited

U.S. PATENT DOCUMENTS

| | | | |
|---|---|---|---|
| 2002/0071436 A1* | 6/2002 | Border | H04B 7/18582 370/395.32 |
| 2003/0126233 A1* | 7/2003 | Bryers | H04L 29/06 709/219 |
| 2010/0306391 A1* | 12/2010 | Mason | G06F 15/173 709/228 |
| 2012/0051236 A1* | 3/2012 | Hegde | H04L 43/10 370/252 |
| 2015/0288603 A1* | 10/2015 | Kandasamy | H04L 45/74 370/392 |

* cited by examiner

*Primary Examiner* — Sulaiman Nooristany
(74) *Attorney, Agent, or Firm* — North Weber & Baugh LLP

(57) ABSTRACT

Embodiments of the present invention include systems and methods for detecting and correcting mismatches between a flow's size and the path maximum transmission unit (PMTU) size. In embodiments, a controller is notified of a new flow's size and compares that to the route path's MTU size. If the controller recognizes a mismatch, it informs an information handling device, such as the first-hop router, to notify the sender of the correct path MTU size—thereby effectively and efficiency notifying the sender to correct the MTU size for that flow.

20 Claims, 5 Drawing Sheets

DETECTING PATH MTU MISMATCH AT FIRST-HOP ROUTER

TECHNICAL FIELD

The present invention relates to networking and networking devices, more particularly, to systems and methods for improve the exchange of information between information handling systems.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data traffic is communicated using various protocols. When two devices are communicating across a network, it tends to be most efficient to communicate using the largest size units of data as possible. In networking, this largest size unit of data is called the maximum transmission unit, or MTU. A Path MTU (PMTU) is the largest packet/datagram of data that can be transmitted between two devices across a particular network path. That is, since there may be multiple paths between the two communicating devices, the MTU size may vary for the different paths. The particular size of a PMTU is a function of several factors, which may include the capabilities and capacities of the devices along a path, the configuration of the network devices, type of protocol(s) being used, and capacity of the interfaces between devices.

Conventional techniques for path MTU discovery may involve first setting a "do not fragment" (DF) flag on a packet sent by a source node. If a router has a communication interface with a next hop MTU size that is smaller than the packet size, an Internet Control Message Protocol (ICMP) error message ("too big") is returned along with the smaller MTU size and the packet is dropped. Upon receiving the ICMP error message, the source node may resend a smaller packet according to the MTU size recorded in the ICMP error message. The resending process may be repeated until the packet is received by the intended destination node. Upon receiving the packet, the destination node may send an acknowledgement message to confirm the MTU of the path. On a path with a plurality of nodes and various MTU sizes, multiple rounds of packet transmission may be necessary to determine the path MTU. Thus the conventional techniques for path MTU discovery are inefficient.

Accordingly, there is need to improve the discovery and correction of path MTU mismatch.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
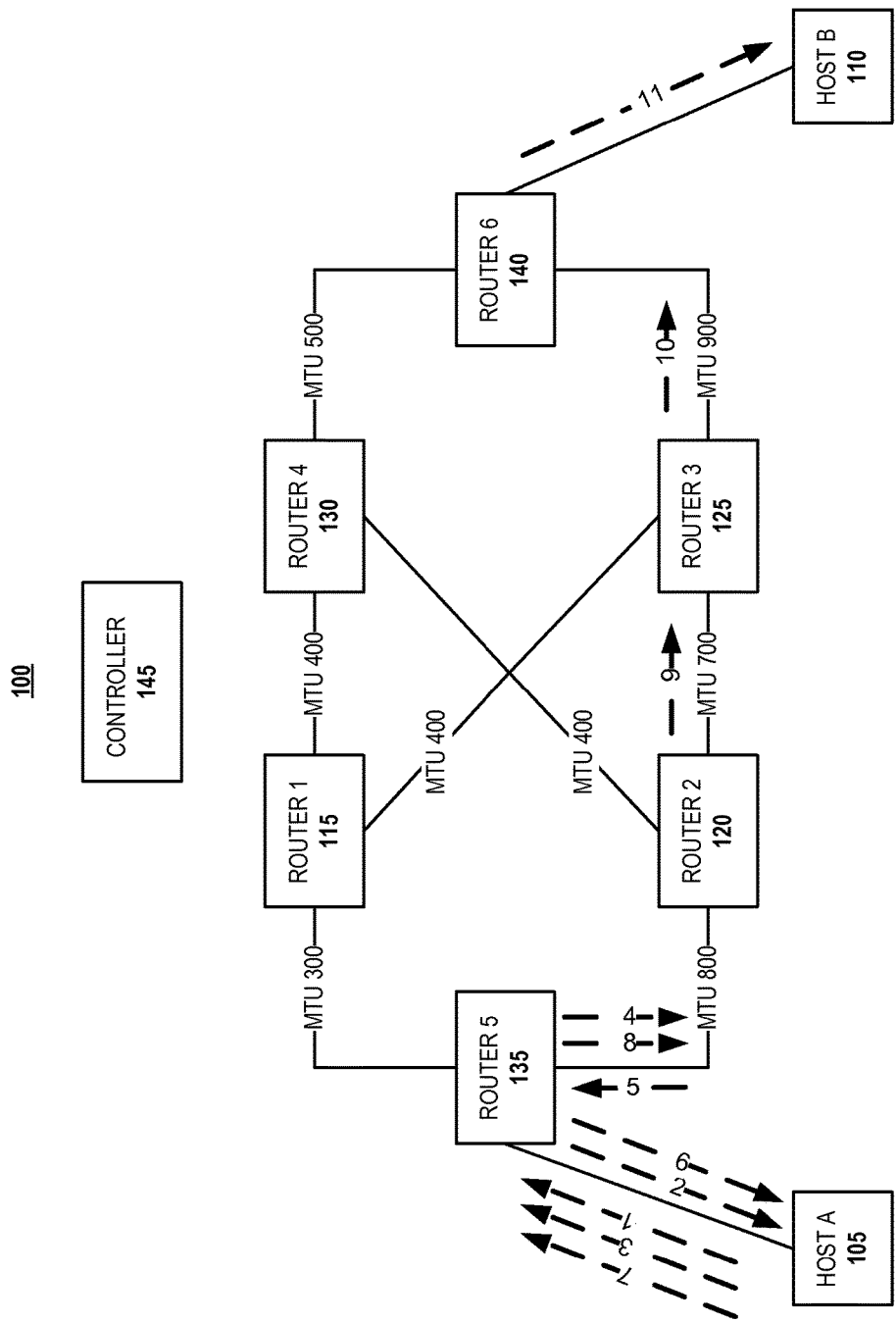
FIG. 1 shows an example path maximum transmission unit discovery flow in a network of information handling systems.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/routers/switches within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

A. Path Maximum Transmission Unit Mismatch

In Internet Protocol version 4 (IPv4) and Internet Protocol version 6 (IPv6), the path maximum transmission unit (PMTU) is found only after the packet reaches the destination and the destination has to reply with a packet for the source to know the path MTU. For networks that support Internet Control Message Protocol (ICMP) packets, an ICMP packet "too big" may also be used for hop-by-hop MTU mismatch. Consider, by way of illustration, the path MTU discovery depicted in FIG. 1.

FIG. 1 shows a typical path maximum transmission unit discovery flow in a network 100 of information handling systems. Depicted in FIG. 1 is a network 100 that includes a source host, Host A 105, plurality of routers (Router 1-Router 6), and a destination host, Host B 110. A typical path maximum transmission unit discovery begins with the source, Host A 105, sending a packet (arrow 1) with a transmission unit size of 1000 bytes (for example) to the first-hop router, Router 5 135. Assume that the packet is to be routed from Router 5 135 to Router 2 120. Because the MTU between those routers is 800, which is less than the packet size of 1000, an ICMP packet (arrow 2) is sent from Router 5 to the source, Host A 105. Host A adjusts the packet transmission unit size to 800 and sends the packet (arrow 3), which gets routed to Router 2 120 (arrow 4).

Assume that the packet is to be routed from Router 2 120 to Router 3 125. Because the MTU between those routers is 700, which is less than the packet size of 800, a message is returned (arrows 5 and 6) to Host A 105 that the size is too big and needs to be changed to 700. Host A adjusts the packet transmission unit size to 700 and sends the packet (arrow 7), which gets routed (arrows 8, 9, 10 and 11) to the end destination, Host B 110 because no other interfaces along the path are below the 700 transmission unit size. Host B may send to Host A an acknowledgement (not shown in FIG. 1) of the receipt of the packet.

Because of the mismatch between the source transmission unit size and various interfaces along the path, there is added data traffic, and delay, as the transmission unit size is adjusted multiple times until the path MTU is found. Such an approach is not efficient. It should be noted that this procedure and its inefficiency exists even if the network includes a software-defined networking (SDN) controller 145 with a load balancer.

In the case of fragmentation of packets being enabled in intermediate routers, packets larger than the PMTU would get fragmented. But, fragmentation causes extra overhead to routers.

Also, such a discovery approach does not account for issues related to multiple paths between hosts in which the paths have different PMTUs. Different flows may take different paths in the case of Equal-Cost Multiple-Path (ECMP) routing. Since the PMTU for a destination is based upon the last flow, a new flow that takes a different path may have either a lower or higher PMTU. If the different path's MTU is lower, there will be delay as the correct PMTU is determined. And, if the different path's MTU is higher, there is inefficiency because more data could be communicated with each packet.

B. General Overview

In embodiments, for software-defined networking (SDN)-based data centers, load balancing of flows happens at a controller. Upon receiving a new flow, a load balancing application may determine a path for the flow from end-to-end and install the flow information in the appropriate intermediate routers. For User Datagram Protocol (UDP) flows, the PMTU is based on flow size, and for Transmission Control Protocol (TCP) packets, actual flow size may be calculated from Maximum Segment Size (MSS) during initial handshake. It should be noted that the MSS is a parameter of the TCP protocol that specifies the largest amount of data, specified in octets, that a computer or communications device can receive in a single TCP segment. The maximum segment size is specified as a TCP option, initially in the TCP SYN packet during the TCP handshake. Because the maximum segment size parameter is controlled by a TCP option, a host may change the value in any later segment.

It should be noted that the Path MTU can be calculated at the SDN controller for a particular flow since the controller has the MTU details of all the discovered interfaces in the network. If the flow size is larger than Path MTU size, the SDN controller can inform the first-hop router to send a packet to the sender with the correct path MTU. In embodiments, the first-hop router can send an ICMP packet "too big" to the host to inform it of the path MTU. In embodiments, the host may be configured to understand the path MTU from other notifications other than ICMP packets. For example, the host may be configured to understand an IPv4/IPv6 packet that is sent back to the host with flow information and the Path MTU.

Aspects of the present invention may also be used in cases in which the load balancing application selects another path for a new flow that results in a path MTU mismatch with the flow's size. Since all flows use the last MTU value in the cache for a destination until the cache entry times out or is changed, a new path for a flow to the same destination can result in a MTU mismatch. According to embodiments of the present invention, the host may be quickly informed that the path this flow has been assigned has a different (higher or lower) MTU capability. This approach can be particularly useful in cases where flows from different application takes different path.

In embodiments, the host may be informed using IPv4/IPv6 packet with flow information. In cases in which the mismatch is a result of the flow's size being larger than the PMTU, an "ICMP packet too big" notification may be sent. In cases in which the mismatch is a result of the flow's size being smaller than the PMTU, a new type of ICMP—"ICMP packet small"—may be sent.

C. Method Embodiments

Figure 2:
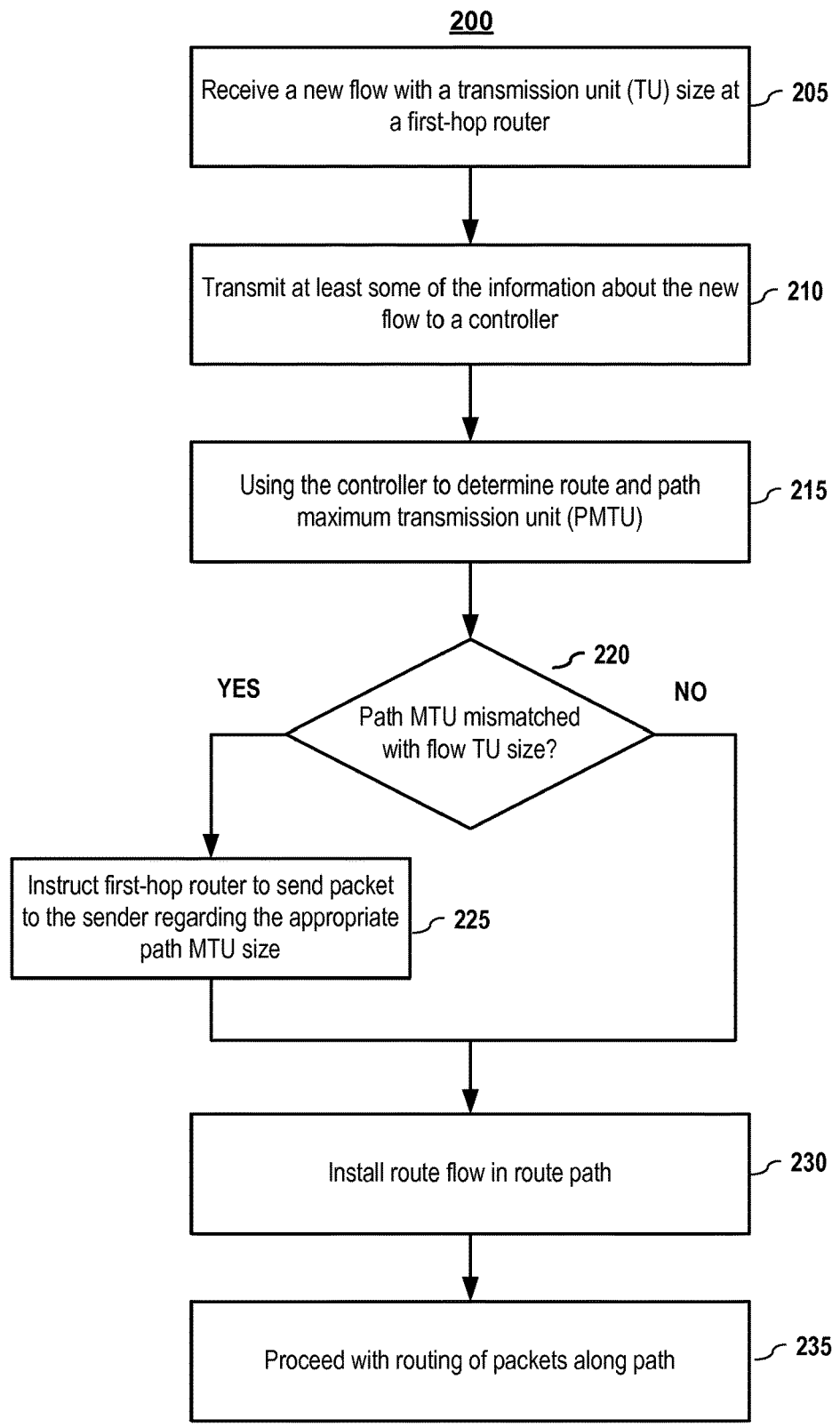
FIG. 2 depicts a method for detecting and correcting path maximum transmission unit size of data packet according to embodiments of the present invention.

FIG. 2 depicts a method for detecting and correcting path maximum transmission unit (PMTU) size of data packets according to embodiments of the present invention. In embodiments, a router, such as the first-hop router, receives (205) a new flow. That new flow will have a transmission unit (TU) size associated with it. In embodiments, the router transmits (210) at least some of the information about the new flow to a controller, which may be a controller of a software-defined network.

In embodiments, the controller, which may include load balancing functionality, determines (215) a route, and since the controller has MTU details of all the discovered interfaces in the network, the path maximum transmission unit (PMTU) for the route can also be determined (215). The PMTU of the determined route may then be compared (220) against the flow's transmission size.

If there is not a mismatch between the PMTU of the determined route and the flow's transmission size, the controller installs (230) the flow information into the routers along the determined flow path. And, the flow traffic proceeds (235) along the path from the source to the destination.

If there is a mismatch (220) between the PMTU of the determined route and the flow's transmission size, the controller instructs (225) the first-hop router to notify the sender of the appropriate path MTU size. It shall be noted that the controller may check for a mismatch that is too big, too small, or both. Thus, in embodiments, if the transmission size is too large or too small, the transmission size of the flow can be corrected to the appropriate size. This approach is more efficient and effective than prior approaches.

In embodiments, the controller may install (230) the flow information into the routers along the determined flow path when it also instructs the first-hop router to notify the sender.

Finally, with the new flow's transmission size properly matching the PMTU, the flow traffic proceeds (235) along the path from the source to the destination.

D. System Embodiments

Figure 3:
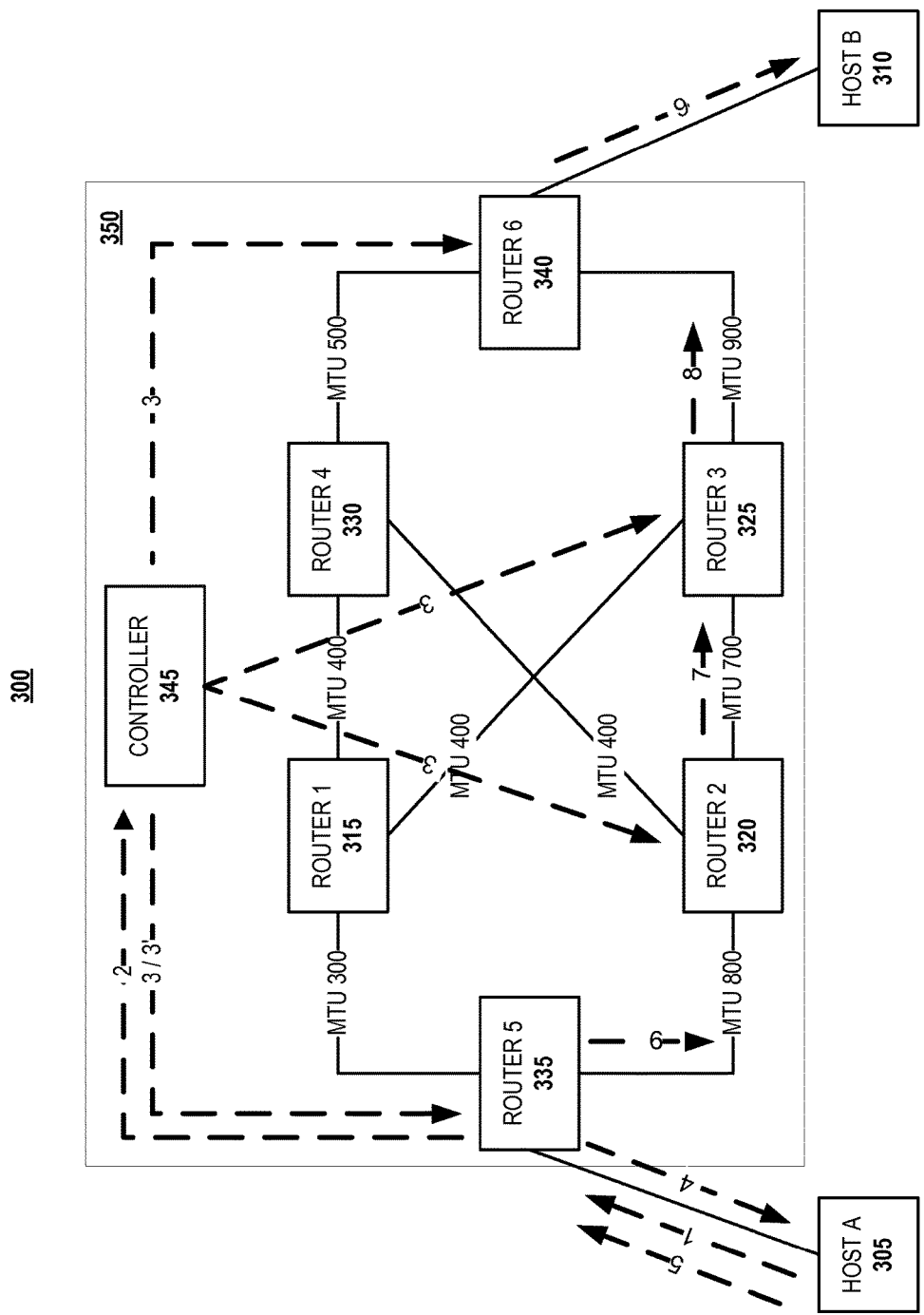
FIG. 3 depicts an example data flow in an example network of information handling systems according to embodiments of the present invention.

By way of illustration, FIG. 3 depicts an example data flow in an example network of information handling systems according to embodiments of the present invention. Depicted in FIG. 3 is an internetwork 300 that includes a source host, Host A 305, a network 350, and a destination host, Host B 310. The network 350 comprises a plurality of information handling systems (Routers 1 315-Router 6 340) and a controller 345.

In the depicted example, Host A 305, sending a packet (arrow 1) with an initial transmission unit size of 1000 bytes (for example) to the first-hop router, Router 5 335. In embodiments, upon receiving a new flow, Router 5 is configured to forward (arrow 2) the packet, or alternatively information about the flow such as source, destination, and flow size, to the controller 345.

In embodiments, the controller 345 includes load balancing functionality. Upon receiving the information from Router 5 about the new flow, the controller load balancer determines a route path for the new flow. In embodiments, the controller 345 is aware of the MTU values of interfaces within the network 350. Thus, when the route path is assigned, the controller also knows the MTU for that path.

Assume that the selected route path is as follows: Router 5 335→Router 2 320 →Router 3 325→Router 6 340 and then to the destination, Host B 310. That route path has a PMTU of 700, as limited by the interface between Router 2 320 and Router 3 325. In embodiments, because the MTU between those routers is 700, which is less than the initial transmission unit size of 1000, the controller recognizes the mismatch and notifies (arrow 3') Router 5 335 to inform (arrow 5) the sender (i.e., Host A) that the it must adjust its packet size to 700 bytes.

In embodiments, the controller also notifies (arrow 3) the appropriate information handling devices of the route path. It should be noted that this notification may be done before, concurrent with, or after the mismatch notification is sent to Router 5. In embodiments, the notification to Router 5 of the mismatch and the route path may be done as part of the same notification or separate notifications.

In embodiments, the host may be informed using IPv4/IPv6 packet with flow information. In cases in which the mismatch is a result of the flow's size being larger than the PMTU, an "ICMP packet too big" notification may be sent. In cases in which the mismatch is a result of the flow's size being smaller than the PMTU, a new type of ICMP notification—"ICMP packet too small"—may be sent. One skilled in the art shall recognize that the information handling devices and the hosts may be configured to send and receive notifications of various formats to communication PMTU mismatch information.

In embodiments, upon receiving the mismatch notification with the PTMU information, Host A adjusts the packet transmission unit size to 700 bytes and sends the data traffic (arrow 5), which gets routed (arrows 6, 7, 8, and 9) along the path (Router 5 335→Router 2 320→Router 3 325→Router 6 340 and then to the destination, Host B 310) without any further MTU mismatch issues. In embodiments, Host B may send to Host A an acknowledgement (not shown in FIG. 3) of the receipt of the packet.

Figure 4:
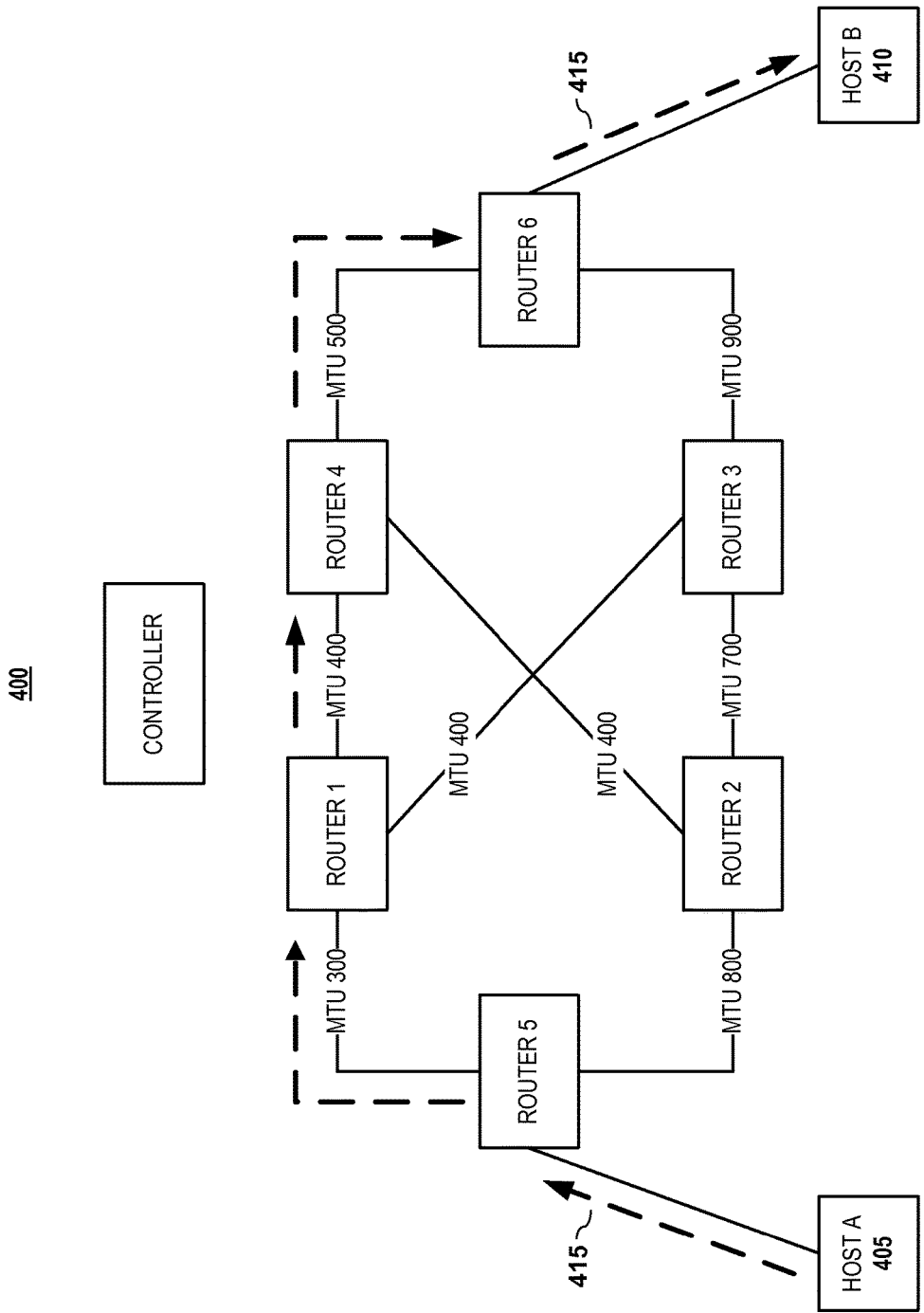
FIG. 4 shows an example of a first data flow between a source host, Host A, and a destination host, Host B, via a network of information handling systems according to embodiments of the present invention.

As noted previously, the present invention is also beneficial in cases in which the load balancer of the controller selects a differ path for a new flow between the same source and destination that results in a path MTU mismatch with the flow's size. Consider, by way of illustration, the flow depicted in FIG. 4. FIG. 4 shows an example of a first data flow 415 between a source host, Host A 405, and a destination host, Host B 410, via a network of information handling systems according to embodiments of the present invention. The PTMU for that route is 300 bytes as indicated between Router 5 and Router 1. Since a host will continue to use the last MTU value in the cache for a destination until the cache entry times out or is changed, a new path, such as the path selected in FIG. 3 (which has an PMTU of 700 bytes), may results in a MTU mismatch. By implementing the present invention, the host is quickly informed that the path this flow uses has a different (higher or lower) MTU capability. This approach can be particularly useful in cases where flows from different application takes different path.

One skilled in the art shall recognize a number of advantages of implement aspects disclosed in this patent document. Some of those advantages include, but are not limited to:

(1) discovery of the PMTU at first-hop router instead of taking the packet to the destination host—thereby being more efficient and more effective;

(2) ICMP does not need to be enabled across the network (such as when there is a firewall(s) installed between the first-hop router and the host to prevent ICMP traffic)—thus, in embodiments, the host may be informed using, for example, IPv4/IPv6 packet with flow information;

(3) avoids fragmentation even in the case of fragmentation-enabled routers—thereby reducing overhead for the routers; and (4) promotes efficient use of the network because if a new flow is assigned a path with a higher PMTU value than the MTU cached at the host, the host is informed of the higher PMTU value so it will send data packets that match the route path's capabilities.

One skilled in the art shall recognize other advantages.

E. Information Handling System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
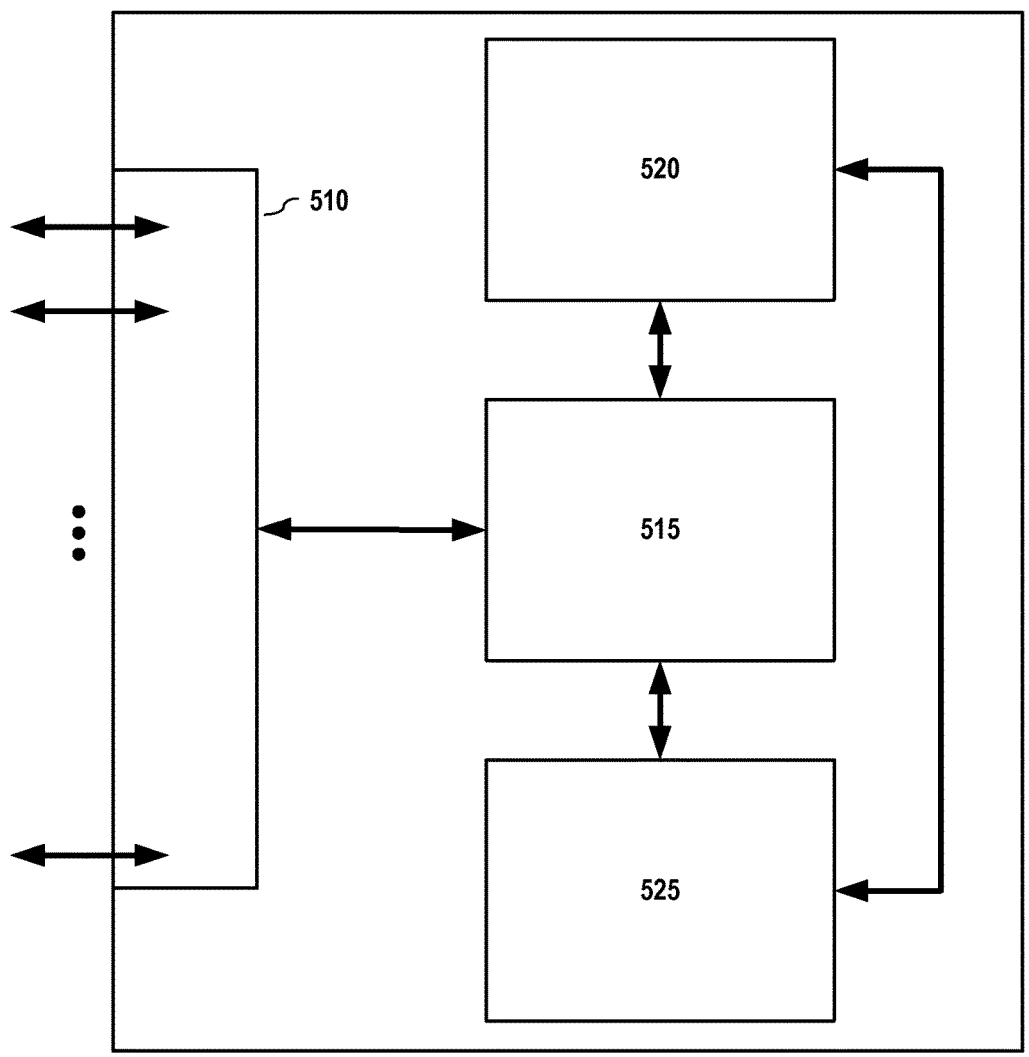
FIG. 5 shows a simplified block diagram of an information handling system according to embodiments of the present invention.

FIG. 5 depicts a simplified block diagram of an information handling system 500 according to embodiments of the present invention. It will be understood that the functionalities shown for device 500 may operate to support various embodiments of an information handling system (or node)—although it shall be understood that an information handling system may be differently configured and include different components. The information handling system 500 may include a plurality of I/O ports 510, a network processing unit (NPU) 515, one or more tables 520, and a central processing unit (CPU) 525. The system includes a power supply (not shown) and may also include other components, which are not shown for sake of simplicity.

In embodiments, the I/O ports 510 may be connected via one or more cables to one or more other network devices or clients. The network processing unit (NPU) 515 may use information included in the network data received at the node 500, as well as information stored in the tables 520, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for correcting path maximum transmission unit (PMTU) size mismatch comprising:

receiving, at a routing system of a network, a packet for a new flow from a source host system to a destination host system, the packet comprising an initial packet transmission unit size, a source host system routing identifier, and a destination host system routing identifier;

responsive to the routing system not having a forwarding routing match for the new flow in its routing table, forwarding at least some of the routing information of the packet including the initial packet transmission unit size to a central controller system of the network, the central controller system knowing the network's topology formed by network nodes in the network and maximum transmission unit size information of routing interfaces of the network nodes in the network;

receiving a notification from the central controller system of the network that the initial packet transmission unit size for the new flow is a mismatch with a path maximum transmission unit size of a route in the network, the route determined by the central controller system of the network from among a plurality of potential routes in the network using the information representing the network's topology and the route comprising a plurality of network nodes in the network but does not include the central controller and wherein the path maximum transmission unit size of the route in the network is determined by the central controller of the network using maximum transmission unit size information of routing interfaces of network nodes that form the route in the network; and notifying the source host system of the mismatch between the initial packet transmission unit size and the path maximum transmission unit of the route in the network determined by the central controller system.

2. The method of claim 1 wherein the mismatch represents the initial packet transmission unit size being larger than the path maximum transmission unit size of the route in the network determined by the central controller system and the host system is notified to reduce its packet transmission unit size to match the path maximum transmission unit size.

3. The method of claim 1 wherein the mismatch represents the initial packet transmission unit size being smaller than the path maximum transmission unit size of the route in the network determined by the central controller system and the host system is notified to increase its packet transmission unit size to match the path maximum transmission unit size.

4. The method of claim 1 wherein the method is performed at a first-hop router.

5. The method of claim 4 wherein the notification to the host system is an Internet Control Message Protocol (ICMP) packet that informs the host system of the PMTU size.

6. The method of claim 5 wherein the ICMP packet notifies the host system that the initial packet transmission unit size is too large.

7. The method of claim 5 wherein the ICMP packet notifies the host system that the initial packet transmission unit size is too small.

8. A method for correcting a path maximum transmission unit size mismatch, the method comprising:
receiving, at a central controller system of a network, packet information for a new flow from a source system to a destination system, the packet information comprising a source identifier of the source system for the new flow, a destination identifier of the destination system, and an initial packet transmission unit size;
using the source identifier, the destination identifier, and information representing the network's topology, which is known to the central controller system, to determine a route path in the network from among a plurality of potential routes in the network, the route path comprising a plurality of network nodes in the network but does not include the central controller system;
given the route path, determining a path maximum transmission unit (PMTU) size based upon maximum transmission unit size information of interfaces of the plurality of network nodes along the route path in the network, wherein the maximum transmission unit size information of interfaces is known to the central controller system before a packet for the new flow has traversed the route path;
comparing the initial packet transmission unit size with the path maximum transmission unit (PMTU) size determined by the central controller system; and
responsive to determining a mismatch between the initial packet transmission unit size and the path maximum transmission unit (PMTU) size, providing a notification of the PMTU size.

9. The method of claim 8 further comprising the step of:
installing the route path information in a set of one or more information handling devices along the route path.

10. The method of claim 8 wherein the packet information is received via a first-hop router.

11. The method of claim 10 wherein the notification of the PMTU size is provided to the first-hop router that, in turn, notifies the source system.

12. The method of claim 11 wherein the first-hop router notifies the source system by an Internet Control Message Protocol (ICMP) packet that informs the source system of the PMTU size.

13. The method of claim 12 wherein the ICMP packet notifies the source system that the initial packet transmission unit size is too big or too small according to the mismatch.

14. The method of claim 11 wherein the mismatch represents the initial packet transmission unit size being bigger than the PMTU size of the route path and the source system is notified to reduce its packet transmission unit size to match the PMTU size.

15. The method of claim 11 wherein the mismatch represents the initial packet transmission unit size being smaller than the PMTU size of the route path and the source system is notified to increase its packet transmission unit size to match the PMTU size.

16. The method of claim 8 wherein the step of using the source identifier and the destination identifier to determine a route path comprises:
using a load balancer to determine the route path in the network.

17. A central controller system of a network for correcting a path maximum transmission unit size mismatch for a flow of data through the network comprising a plurality of information handling systems, the controller system comprising:
a plurality of ports for facilitating communications with one or more of the plurality of information handling systems communicatively coupled to the controller;
one or more processors that are communicatively coupled to the plurality of ports; and
a non-transitory memory comprising one or more sequences of instructions which, when executed by the one or more processors, causes steps to be performed comprising:
receiving, at the central controller system of the network, packet information for a new flow from a source system to a destination system, the packet information comprising a source identifier of the source system for the new flow, a destination identifier of the destination system, and an initial packet transmission unit size;
using the source identifier, the destination identifier, and information representing the network's topology, which is known to the central controller system, to determine a route path in the network from among a plurality of potential routes in the network, the route path comprising a plurality of network nodes in the network but does not include the central controller system;
given the route path in the network, determining a path maximum transmission unit (PMTU) size based upon maximum transmission unit size information of interfaces of the plurality of network nodes along the route path in the network, wherein the maximum transmission unit size information of interfaces is known to the central controller system before a packet for the new flow has traversed the route path;
comparing the initial packet transmission unit size with the path maximum transmission unit (PMTU) size determined by the central controller system; and
responsive to determining a mismatch between the initial packet transmission unit size and the path maximum transmission unit (PMTU) size, providing a notification of the PMTU size.

18. The controller of claim 17 wherein the non-transitory memory further comprises one or more sequences of instructions which, when executed by the one or more processors, causes steps to be performed comprising:
   installing the route path information in a set of one or more information handling devices along the route path.

19. The method of claim 17 wherein the packet information is received via a first-hop router and the notification of the PMTU size is provided to the first-hop router that, in turn, notifies the source system.

20. The method of claim 19 wherein the source system is notified that the initial packet transmission unit size is too big or too small according to the mismatch.

\* \* \* \* \*